(12) United States Patent
Wang et al.

(10) Patent No.: US 10,320,597 B2
(45) Date of Patent: Jun. 11, 2019

(54) SCHEDULING OF USERS FOR MULTI-USER TRANSMISSION IN A WIRELESS COMMUNICATION SYSTEM

(71) Applicant: Telefonaktiebolaget LM Ericsson (publ), Stockholm (SE)

(72) Inventors: Meng Wang, Sundbyberg (SE); Leif Wilhelmsson, Dalby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/750,619

(22) PCT Filed: Aug. 26, 2015

(86) PCT No.: PCT/SE2015/050899
§ 371 (c)(1),
(2) Date: Feb. 6, 2018

(87) PCT Pub. No.: WO2017/034448
PCT Pub. Date: Mar. 2, 2017

(65) Prior Publication Data
US 2019/0020516 A1    Jan. 17, 2019

(51) Int. Cl.
*H04L 27/26* (2006.01)
*H04B 7/0452* (2017.01)
(Continued)

(52) U.S. Cl.
CPC ....... *H04L 27/2607* (2013.01); *H04B 7/0452* (2013.01); *H04L 5/0037* (2013.01);
(Continued)

(58) Field of Classification Search
CPC ............. H04L 27/2607; H04L 5/0037; H04L 27/2646; H04B 7/0452; H04W 72/121; H04W 74/0833
See application file for complete search history.

(56) References Cited

U.S. PATENT DOCUMENTS

2006/0176966 A1    8/2006 Stewart et al.
2007/0159957 A1*   7/2007 Ljung ................ H04L 27/2607
                                           370/208
(Continued)

FOREIGN PATENT DOCUMENTS

EP    2782274 A1    9/2014
WO    2015058710 A2    4/2015

OTHER PUBLICATIONS

Azizi, Shahrnaz et al., "OFDMA Numerology and Structure", Doc.: IEEE 802.11-15/0330r1, Mar. 9, 2015, 1-38.
(Continued)

*Primary Examiner* — Syed Haider
(74) *Attorney, Agent, or Firm* — Murphy, Bilak & Homiller, PLLC

(57) ABSTRACT

There is provided a method and corresponding arrangements for scheduling users with different Guard Interval, GI, length for multi-user transmission in a wireless communication system, where each of the users is associated with a GI length. The proposed technology involves grouping at least a subset of the users into at least two groups according to GI length for transmission in allocated transmission opportunity, TXOP, resources. In this way, by dynamically scheduling at least part of the users for group-wise transmission according to GI length, the spectral efficiency can be improved. The proposed technology allows for higher scheduling flexibility when different users have different GI length requirements.

12 Claims, 12 Drawing Sheets

(51) Int. Cl.
*H04L 5/00* (2006.01)
*H04W 72/12* (2009.01)
*H04W 74/08* (2009.01)

(52) U.S. Cl.
CPC ....... *H04L 27/2646* (2013.01); *H04W 72/121* (2013.01); *H04W 74/0833* (2013.01)

(56) References Cited

U.S. PATENT DOCUMENTS

| | | | |
|---|---|---|---|
| 2007/0171810 A1* | 7/2007 | Suda | H04L 27/2605 370/208 |
| 2009/0245413 A1* | 10/2009 | Miyoshi | H04L 27/2605 375/295 |
| 2009/0274126 A1* | 11/2009 | Satou | H04W 56/0045 370/336 |
| 2011/0164597 A1* | 7/2011 | Amini | H04L 1/0041 370/338 |
| 2015/0139089 A1 | 5/2015 | Azizi et al. | |

OTHER PUBLICATIONS

Porat, Ron et al., "Payload Symbol Size for 11ax", Doc.: IEEE 802.11-15/0099, Jan. 12, 2015, 1-33.
Ryu, Kiseon et al., "UL MU Procedure", Doc.: IEEE 802.11-15/0365r0, Mar. 9, 2015, 1-16.
Unknown, Author , "Self-Organizing D2D Communication Using Knowledge Enforcement", 3GPP TSG-RAN WG1 #76bis, R1-141235, IAESI, Shenzhen, China, Mar. 31-Apr. 4, 2014, pp. 1-7.

* cited by examiner

Fig. 6

SCHEDULING OF USERS FOR MULTI-USER TRANSMISSION IN A WIRELESS COMMUNICATION SYSTEM

TECHNICAL FIELD

The proposed technology generally relates to wireless communications technology, and more particularly to a method and corresponding arrangement for scheduling users with different Guard Interval, GI, length for multi-user transmission in a wireless communication system, and a method and corresponding arrangement for determining an indication of GI length for at least one user in a wireless communication system, as well as corresponding computer programs and computer-program products and apparatuses.

BACKGROUND

In order to improve the performance of wireless communication systems more and more advanced features are continuously introduced. By way of example, multi-user transmission schemes are introduced and a generally higher degree of flexibility in selecting operating parameters is also allowed.

For example, in Wireless Local Area Network, WLAN, technologies such as Wi-Fi there is an on-going development of the underlying standards and the technology as such.

Since the 802.11a standard, the 802.11 physical layer has been built on Orthogonal Frequency Division Multiplexing (OFDM) structure. The basic parameters for OFDM have been unchanged till the latest official version of the standard, 802.11 ac. These basic OFDM parameters include:

1. Fundamental bandwidth 20 MHz with 64-point Fast Fourier Transform (FFT). In later versions, wider bandwidth options 40 MHz, 80 MHz, and 160 MHz have been introduced gradually and the FFT sizes increase accordingly such that the subcarrier spacing remains unchanged.

2. Subcarrier spacing 312.5 kHz.

3. OFDM symbol duration 3.2 micro-second (us) plus 0.8 us or 0.4 us guard interval (GI).

In the next-generation high-efficiency WLAN, IEEE 802.11ax, an improvement objective is to increase the robustness in outdoor and other challenging propagation environments. For such an objective, the 802.1 lax Task Group, TG, has agreed to replace the current symbol duration of 3.2 us with longer symbol duration of 12.8 us by increasing FFT size from 64 to 256 for the 20 MHz channel and accordingly of the wider bandwidths, as indicated in reference [1].

From the overhead perspective, longer symbol duration enables longer GI to protect against multi-path delay spread that may be more challenging in outdoor environments without an increase in the relative overhead. The TG has also agreed on supporting three GI sizes:

1. 0.8 us: same as the regular GI size in current 802.11ac. The GI overhead (GI duration divided by overall symbol duration) is 0.8/(0.8+12.8)=5.9%.

2. 1.6 us: percent-wise short GI. The GI overhead is 1.6/(1.6+12.8)=11.1%.

3. 3.2 us: percent-wise long GI. The GI overhead is 3.2/(3.2+12.8)=20%.

Additional important features that have been decided to be introduced in 802.1 lax include Multi-User, MU, features such as downlink/uplink DL/UL OFDMA and UL Multi-User Multiple Input Multiple Output, MU-MIMO. DL MU-MIMO has been standardized in 802.11ac. To support MU-MIMO, the corresponding sounding procedure has been defined: Upon request, the STA feedbacks a Very High Throughput, VHT, Compressed Beamforming frame that includes information on the channel state between the "beamformer" and the "beamformee". The measurement of the channel state is based on the VHT Non-Data Packet, NDP. This VHT Compressed Beamforming report provides a steering matrix for beamforming and per-tone SNR information.

The MU features are also part of the reason for the above described change of the basic OFDM parameters. The MU feature is less robust and requires higher-level robustness for implementation. Since dense wideband stations, STAs and Overlapping Basic Service Sets, OBSSs, scenarios may cause severe system degradation by contentions, such MU transmission is usually scheduled at a guaranteed Transmit Opportunity, referred to as TXOP. TXOP is a period during which a single or multiple STAs can transmit data frames without any contention/backoff procedure. This ensures the channel availability for MU scheduling.

DL/UL OFDMA can, in principle, take advantage of both Frequency Diversity, FD, gain and Frequency-Selective Scheduling, FSS, gain. The FD gain is e.g. achieved by allocating one user's subcarriers over essentially the entire frequency band, and the FSS gain is achieved by allocating all accessible users' subcarriers adaptively based on channel knowledge such that they are transmitted on relatively better channels. The 802.11ax standard will consider the latter case with continuous subcarrier allocation, i.e., subcarrier sub-bands. There is a tradeoff in obtaining FSS gain and the complexity: smaller resource unit size potentially provides higher FSS gain at the expense of larger feedback and signaling feedback. For this tradeoff, the 802.1 lax study group has agreed to limit the options of resource unit size, i.e. the sub-band size, for FSS given different available bandwidth in the following way, as outlined in reference [2]:

1. 20 MHz bandwidth (totally 256 subcarriers): 26-subcarriers (with 2 pilots), 52-subcarriers (with 2 pilots), 102 data-subcarrier plus 4-6 plots (to be decided)

2. 40 MHz bandwidth (totally 512 subcarriers): two replicas of 20 MHz bandwidth options 3. 80 MHz bandwidth (totally 1024 subcarriers): two replicas of 40 MHz bandwidth options.

To summarize: GI configuration becomes flexible. The determination of GI length for OFDMA, and also for MU-MIMO, is closely related to individual user's channel's delay spread and other parameters. However, different STAs may experience different channel condition from time to time and the set of STAs involved in multi-user transmission is also time-varying.

Due to increased FFT size, more options for longer GI have been introduced. For MU transmissions that multiplex several users simultaneously, in particular DL/UL OFDMA, transmissions to/from individual users should preferably adopt the same GI length. Otherwise, in the UL, the FFT window across different users' sub-bands cannot line up and the orthogonality will be lost. Also in the DL, a determined GI length is usually required to generate the OFDMA symbols with orthogonality preserved between sub-carriers.

On the other hand, in principle, the GI length should be optimized for each user based on their individual channel condition and/or data demand: if the GI length is too long, data rate is sacrificed for GI overhead; if the GI length is too short, extra inter-symbol interference occurs and thus degrades the receiver performance.

There are thus conflicting requirements that needs to be resolved in some way when introducing the new numerology for next generation wireless systems such as WLAN systems and particularly WiFi, especially with respect to scheduling of users for multi-user transmission.

Reference [4] relates to Multi-User uplink, MU-UL, communications within Multiple User, Multiple Access, MU-MA, and/or MIMO systems. With respect to supporting such MU-MIMO UL communications, certain considerations such as time synchronization, frequency synchronization, and/or power control (including wireless communication device/user grouping) may be performed. Wireless communication devices may be categorized into groups based on the power of signals received therefrom.

Reference [5] relates to an LTE-related system and method for setting a Cyclic Prefix, CP, length, and mentions that the CP length may be set in accordance with implicit or explicit indicators without requiring timing advance commands.

SUMMARY

It is an object to provide an improved method for scheduling users in a wireless communication system.

It is also an object to provide a method for determining an indication of Guard Interval, GI, length for at least one user in a wireless communication system.

Another object is to provide an improved arrangement for scheduling users in a wireless communication system.

Yet another object is to provide a network device comprising such an arrangement.

Still another object is to provide an arrangement configured to determine an indication of Guard Interval, GI, length for at least one user in a wireless communication system.

It is also an object to provide a communication unit comprising such an arrangement.

It is another object to provide a computer program for scheduling users in a wireless communication system.

Yet another object is to provide a computer program for determining an indication of Guard Interval, GI, length for at least one user in a wireless communication system.

Still another object is to provide corresponding computer-program products.

It is an object to provide an apparatus for scheduling users in a wireless communication system.

It is also an object to provide an apparatus for determining an indication of Guard Interval, GI, length for at least one user in a wireless communication.

These and other objects are met by at least one of the embodiments of the proposed technology.

According to a first aspect, there is provided a method for scheduling users with different Guard Interval, GI, length for multi-user transmission in a wireless communication system, where each of the users is associated with a GI length. The method comprises grouping at least a subset of the users into at least two groups according to GI length for transmission in allocated transmission opportunity, TXOP, resources.

In this way, by dynamically scheduling at least part of the users for group-wise transmission according to GI length, the spectral efficiency can be improved. The proposed technology allows for higher scheduling flexibility when different users have different GI length requirements.

According to a second aspect, there is provided a method for determining an indication of Guard Interval, GI, length for at least one user in a wireless communication system. The method comprises deriving the indication of GI length at least partly based on an indication of sub-band size of said at least one user.

In this way, implicit signaling of GI length is enabled in an efficient manner.

According to a third aspect, there is provided an arrangement configured to schedule users with different Guard Interval, GI, length for multi-user transmission in a wireless communication system, each of the users being associated with a GI length. The arrangement is configured to group at least a subset of the users into at least two groups according to GI length for transmission in allocated transmission opportunity, TXOP, resources.

According to a fourth aspect, there is provided a network device comprising an arrangement according to the third aspect.

According to a fifth aspect, there is provided an arrangement configured to determine an indication of Guard Interval, GI, length for at least one user in a wireless communication system. The arrangement is configured to derive the indication of GI length at least partly based on an indication of sub-band size of said at least one user.

According to a sixth aspect, there is provided a communication unit comprising an arrangement according to the fifth aspect.

According to a seventh aspect, there is provided a computer program comprising instructions, which when executed by at least one processor, cause the at least one processor to schedule users with different Guard Interval, GI, length for multi-user transmission in a wireless communication system, by grouping at least a subset of the users into at least two groups according to GI length for transmission in allocated transmission opportunity, TXOP, resources.

According to an eighth aspect, there is provided a computer program comprising instructions, which when executed by at least one processor, cause the at least one processor to determine an indication of Guard Interval, GI, length for at least one user in a wireless communication system at least partly based on an indication of sub-band size of said at least one user.

According to a ninth aspect, there is provided a computer-program product comprising a computer-readable medium having stored thereon a computer program according to the seventh or eighth aspect.

According to a tenth aspect, there is provided an apparatus for scheduling users with different Guard Interval, GI, length for multi-user transmission in a wireless communication system, wherein each of the users is associated with a GI length. The apparatus comprises a grouping module for grouping at least a subset of the users into at least two groups according to GI length for transmission in allocated transmission opportunity, TXOP, resources.

According to an eleventh aspect, there is provided an apparatus for determining an indication of Guard Interval, GI, length for at least one user in a wireless communication. The apparatus comprises a deriving module for deriving the indication of GI length at least partly based on an indication of sub-band size of said at least one user.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 6 is a schematic diagram illustrating an example of scheduling in which at least one of the groups, in addition to having a set of users with the same GI length, also has at least one additional user, a so-called outlier, with a different GI length added to the group for transmission in the same TXOP.

DETAILED DESCRIPTION

Throughout the drawings, the same reference designations are used for similar or corresponding elements.

Figure 1:
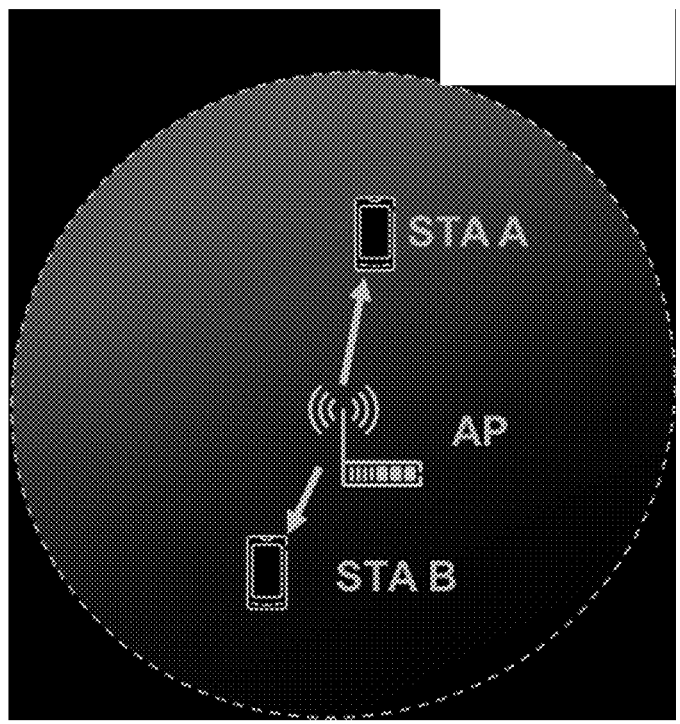
FIG. 1 is a schematic diagram illustrating a simplified example of a WLAN system comprising an access point and associated stations.

For a better understanding of the proposed technology, it may be useful to begin with a brief overview of a particular example of a WLAN system with reference to FIG. 1. In this simplified example, the WLAN system comprises an access point, AP, and two associated stations STA A and STA B. Wireless communication is possible in both uplink and downlink directions within a local coverage area.

As used herein, the non-limiting terms "station", "user", "User Equipment, UE", "terminal" and "wireless communication device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPad, customer premises equipment, CPE, laptop embedded equipment, LEE, laptop mounted equipment, LME, USB dongle, a portable electronic radio communication device, a sensor device equipped with radio communication capabilities or the like.

In particular, the terms "station", "user", "UE", "terminal" and "wireless communication device" may be used interchangeably and should be interpreted as non-limiting terms comprising any type of wireless device communicating with an access point or a radio network node in a wireless communication system or any device equipped with radio circuitry for wireless communication according to any relevant standard for communication within a wireless communication system.

As used herein, the non-limiting term "access point" may refer to any type of access points and base stations, but possibly also network control nodes such as access controllers, network controllers, radio network controllers, base station controllers, and the like.

The non-limiting term "communication unit" may refer to both access points and wireless communication devices, and may hence be interpreted to encompass units on the network side and/or units on the user side.

Figure 2:
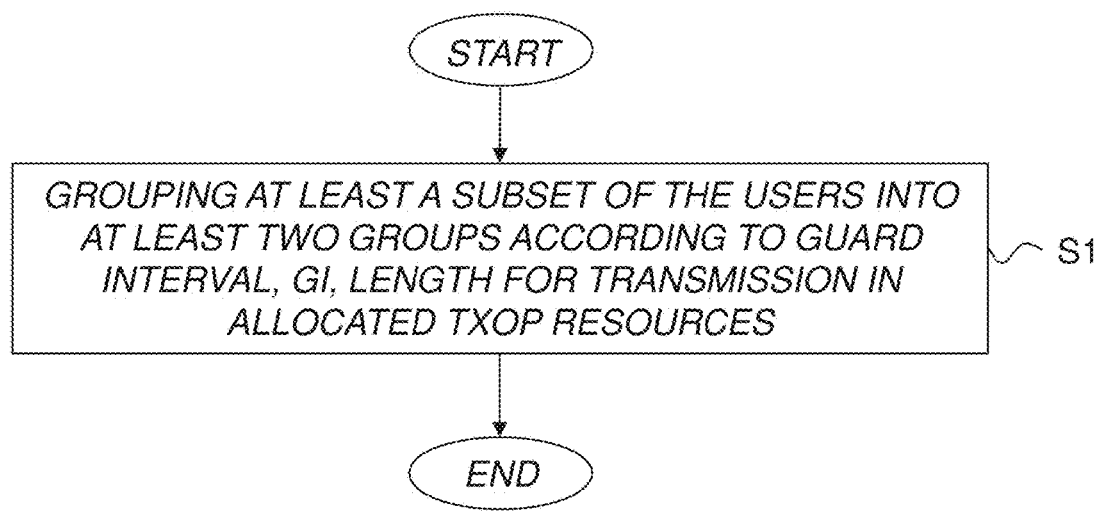
FIG. 2 is a schematic flow diagram illustrating an example of a method for scheduling users with different Guard Interval, GI, length for multi-user transmission in a wireless communication system according to an embodiment.

FIG. 2 is a schematic flow diagram illustrating an example of a method for scheduling users with different Guard Interval, GI, length for multi-user transmission in a wireless communication system according to an embodiment. It is assumed that each of the users is associated with a GI length. The method basically comprises the step S1 of grouping at least a subset of the users into at least two groups according to GI length for transmission in allocated transmission opportunity, TXOP, resources.

In other words, users may be grouped according to GI length for group-wise transmission, i.e. transmission group by group, of user data and corresponding control data in allocated TXOP resources.

In this way, by dynamically scheduling at least part of the users for group-wise transmission according to GI length, the spectral efficiency can be improved. The proposed technology allows for higher scheduling flexibility when different users have different GI length requirements.

Considering a given group of users, these users may be scheduled for multi-user transmission as a group in a given TXOP.

By way of example, users with the same GI length may be grouped for transmission in the same TXOP.

With more than one group, users may then be scheduled for multi-user transmission group by group.

For example, groups of different GI length may be scheduled for transmission in different TXOPs.

Figure 3:
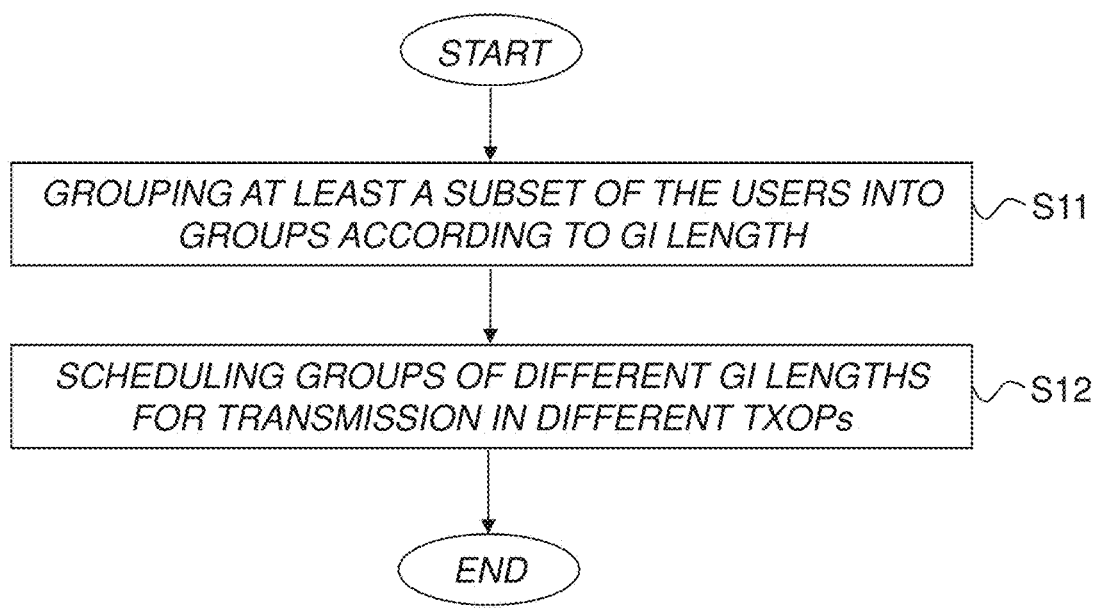
FIG. 3 is a schematic flow diagram illustrating an example of a method for scheduling users with different Guard Interval, GI, length for multi-user transmission in a wireless communication system according to a particular embodiment.

FIG. 3 is a schematic flow diagram illustrating an example of a method for scheduling users with different Guard Interval, GI, length for multi-user transmission in a wireless communication system according to a particular embodiment. Step S11 involves grouping at least a subset of the users into groups according to GI length. Step S12 involves scheduling groups of different GI lengths for transmission in different TXOPs.

In a particular example, different TXOPs may be related to different buffering queues, primarily one for each GI length.

The groups may for example be prioritized according to a predefined prioritization criterion.

As an example of a prioritization rule, after organizing users into groups according to GI length, at least a subset of the groups may be prioritized based on user latency requirements.

In a particular example, for each of the users, a desired or requested GI length is determined to enable grouping of users based on GI length. As an example, the desired or requested GI length may have been determined based on information representative of a user's channel conditions and/or data demand, and can thus be regarded as some form of optimal GI length for that particular user.

Anyway, information on GI length for each user, is provided as a basis or input for grouping of users according to GI length.

The Guard Interval may for example be seen as an interval with the function of guarding or keeping the orthogonality and mitigating the effects of delay spread.

Figure 5:
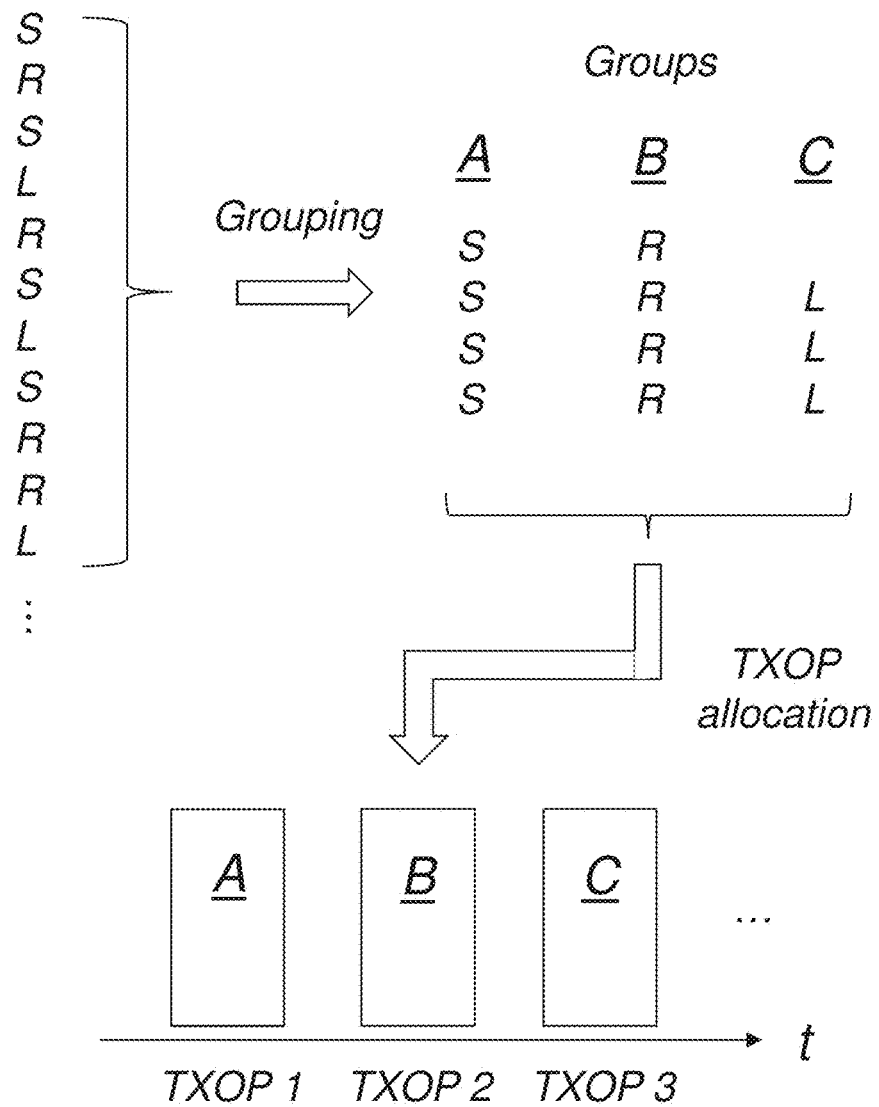
FIG. 5 is a schematic diagram illustrating an example of how users can be grouped according to GI length for transmission in allocated TXOPs according to an embodiment.

FIG. 5 is a schematic diagram illustrating an example of how users can be grouped according to GI length for transmission in allocated TXOPs according to an embodiment. Assuming there are a number of users with different GI length requirements. Each user is associated with a GI length. This may be a desired, requested or otherwise determined GI length for that particular user. In this particular example, three different GI lengths are considered, although the skilled person understands that the actual number of possible or selectable GI lengths may vary depending on standardization or system requirements:

S—Short GI
R—Regular GI
L—Long GI.

In this example, the users are grouped into the groups A, B and C, where mainly users with Short GI, S, are arranged in group A, users with Regular GI, R, are arranged in group B and users with Long GI, L, are arranged in group C. In the overall scheduling procedure, TXOP resources are allocated and users are arranged in groups according to GI length for group-wise transmission in allocated TXOP resources. In this particular example, group A is allocated for transmission in TXOP 1, users in group B for transmission in TXOP 2, and users in group C for transmission in TXOP 3.

Normally, groups of different GI lengths are scheduled for transmission in different TXOPs, although there may be exceptions to this scheduling and/or grouping principle as will be explained below.

Figure 6:
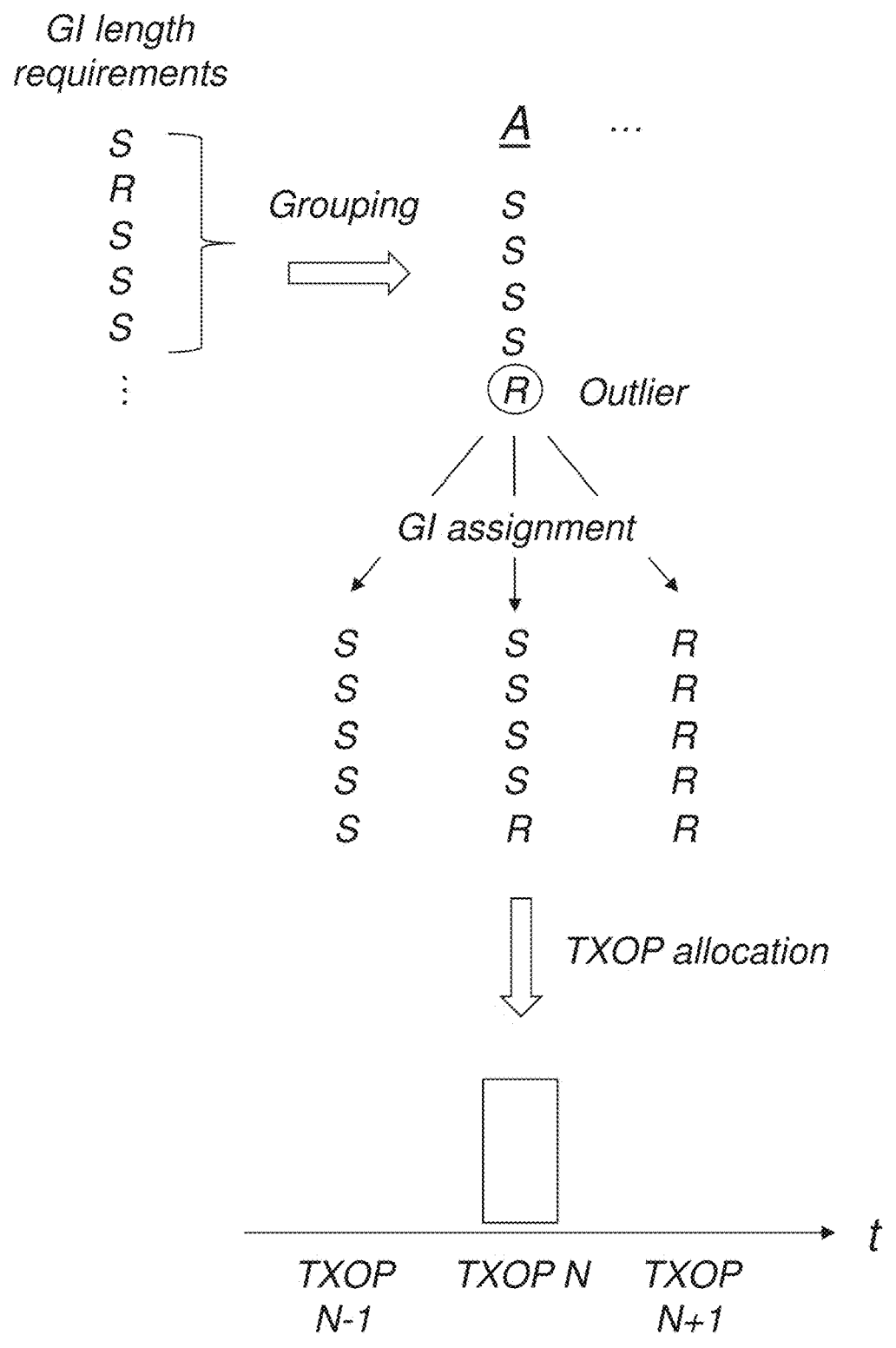

FIG. 6 is a schematic diagram illustrating an example of scheduling in which at least one of the groups, in addition to having a set of users with the same GI length, also has at least one additional user, a so-called outlier, with a different GI length added to the group for transmission in the same TXOP.

In addition to users with the same GI length being grouped for transmission in the same TXOP, at least one additional user with a different GI length may be added to the group for transmission in the same TXOP.

According to a particular example, this means that at least one of the groups, in addition to having a set of users with the same GI length, also has at least one additional user with a different GI length added to the group for transmission in the same TXOP.

By way of example, this may be desirable when one or more users has/have high priority for transmission and it is beneficial to schedule such user(s) in one of the earliest groups.

In the particular example of FIG. 6, a set of users with a Short GI length, S, are arranged in group A for transmission in TXOP N. However, in addition to these users, there is also a user with Regular GI length, R, that is added to the group for transmission in the same TXOP.

There may be different principles for finally assigning the GI length of the users in such a mixed GI length group.

By way of example, a common GI length may be assigned to all users scheduled for transmission in the TXOP. In other words, users with different requested, or desired optimal GI may be grouped for transmission in the same TXOP, but assigned a common, unified GI.

For example, the common GI length may be set to the longest GI among the users scheduled for transmission in the TXOP. In the example of FIG. 6, this is illustrated as the right-most case where all users are being assigned Regular GI, R.

Alternatively, the common GI length may be set to the GI which most users have among the users scheduled for transmission in the TXOP. In the example of FIG. 6, this is illustrated as the left-most case where all users are being assigned Short GI, S.

When a common GI length is used or assigned, an indication of the common GI length may be signaled to the receiver side.

In another example, for said at least one group, the GI length of each user corresponds to a desired or requested GI length. In the example of FIG. 6, this is illustrated as the middle case of the GI assignment options.

The proposed technology may dynamically switch between the different principles for finally assigning the GI length, e.g. according to channel conditions and/or supported MCS.

In an optional embodiment, sub-band frames may be time aligned by adjusting the data field to compensate for packet length difference due to difference in GI length between users. By way of example, for a user with a shorter GI, it is possible to fill up the packet with more data to increase the efficiency.

In another optional embodiment, users with the same GI length may be arranged, in the frequency domain, in adjacent sub-bands.

In general, information representing the GI length may be signaled to the receiver side, explicitly or implicitly, as will be exemplified later on.

The proposed technology is generally applicable to any wireless communication system employing multi-user transmission and having users with different GI length requirements. As an example, the wireless communication system may be a WLAN system such as Wi-Fi system.

For example, the multi-user transmission may be based on Orthogonal Frequency Division Multiple Access, OFDMA, or Multi-User Multiple Input Multiple Output, MU-MIMO.

By way of example, the method is applicable for downlink scheduling and/or uplink scheduling.

Figure 4:
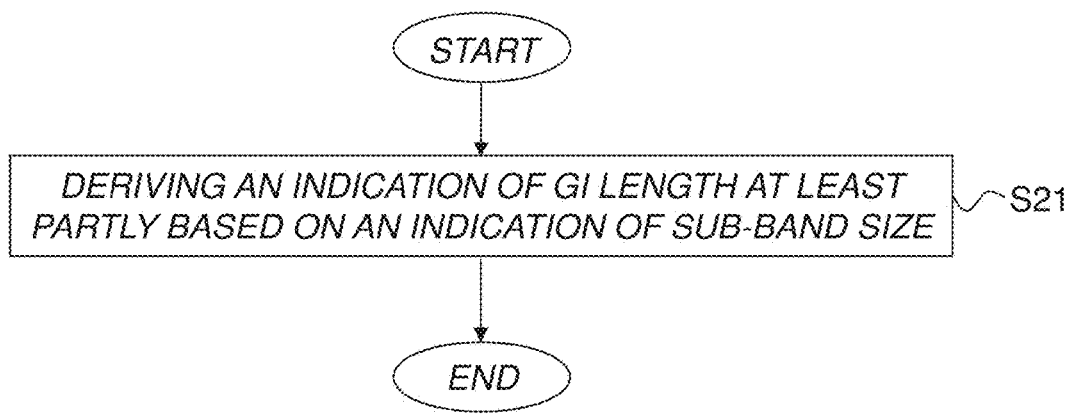
FIG. 4 is a schematic flow diagram illustrating an example of a method for determining an indication of Guard Interval, GI, length for at least one user in a wireless communication system according to an embodiment.

FIG. 4 is a schematic flow diagram illustrating an example of a method for determining an indication of Guard Interval, GI, length for at least one user in a wireless communication system according to an embodiment.

According to a second aspect, there is provided a method for determining an indication of Guard Interval, GI, length for at least one user in a wireless communication system. The method comprises the step S21 of deriving an indication of GI length at least partly based on an indication of sub-band size of said at least one user. In this way, implicit signaling of GI length is enabled in an efficient manner.

In a first example embodiment, implicit derivation/signaling of GI length can be implemented by a direct mapping relationship between sub-band size and GI length.

In a second example embodiment, the existing one-bit signaling field for short/long GI in current standards may be reused jointly with sub-band size indication. By way of example, consider short/regular/long GI options. In a particular example, the one-bit GI indication field may be used to differentiate between i) short GI and ii) regular/long GI. Then, a decision whether it is a regular GI or long GI may be taken based on an indication of sub-band size. In other words, an indication of GI length may be derived by reusing the one-bit GI length indication in current systems. For example, "0" represents short GI and "1" represents regular or long GI. Next, a differentiation between regular GI and long GI may be performed based on sub-band size. Similarly, the one-bit GI indication field may be used to differentiate between i) short/regular GI and ii) long GI. Then short GI and regular GI may be differentiated by sub-band size.

For a better understanding of the proposed technology, reference will now be made to a number of non-limiting examples within the context of OFDMA. It should though be understood that at least some of the embodiments of the proposed technology can also be applied to other multi-user transmission schemes such as MU-MIMO.

In a specific aspect, the proposed technology provides a method of dynamically scheduling OFDMA users that may have different GI length. For each OFDMA user, an optimal GI may be selected, e.g. according to individual channel conditions.

In a particular embodiment, a procedure of grouping users is proposed, in which users with the same GI length are grouped into same TXOPs and TXOPs with different GI lengths are ordered and prioritized.

In another particular embodiment, STAs with different GIs may be grouped into one TXOP. This feature ensures that each user can preserve the optimal GI length. The consequent inter-carrier interference can be reduced by arranging STAs with same GI length in adjacent sub-bands.

The proposed technology may enable higher flexibility in OFDMA or other MU scheduling when different users have different GI lengths. The proposed technology may also increase spectral efficiency by dynamic optimization.

The proposed technology is primarily intended for downlink OFDMA, but may be used in other scenarios as well, as already indicated.

As mentioned, the additional options of GI length open up an extra degree of freedom for access point, AP, or station, STA, receiver to request the optimal GI length. For each user to be modulated in OFDMA, the optimal GI length for each user may be time-varying. In addition, it could be different from other users, as the optimal GI is determined by individual instant channel condition and/or data demand. For example, in the DL, 0.8 us GI may be sufficient for STA1, whereas this GI length would cause inter-symbol interference for STA2 due to its longer delay spread. The time-varying GI length can be dynamically selected according to user's individual channel condition. One example is that the individual GI selection is based on the user's individual maximum delay spread or root-mean square delay spread.

Individual optimization based on channel conditions and/or data demand thus normally means a proper selection of GI. If the GI is too short, inter-symbol interference results and if the GI is longer than needed, too much overhead is wasted. By way of example, GI length can be optimized or properly selected for each individual user according to the delay spread feedback. The supported Modulation and Coding Scheme, MCS, and/or Signal-to-Interference-and-Noise Ratio, SINR, may also be a selection criteria for GI.

Now, if the users with different optimal GI have to be modulated into the same OFDMA symbol, then some users cannot get its individual best GI. In order to solve this problem, an idea is to group users according to GI length requirements and for example to group users with the same GI.

In both DL and UL, the data transmissions to/from different STAs may request different GI lengths. When grouping users into OFDMA TXOPs, the GI length and the entire OFDMA symbol size, CP plus symbol duration, may vary from one OFDMA TXOP to another. For example, in one OFDMA TXOP, 1.6 us GI is adopted for transmission while in the next OFDMA TXOP, a longer 3.2 us GI is adopted because the STAs involved in this TXOP may be at the edge of outdoor coverage and thus demand longer GI.

Although the term "TXOP" is used here in the context of OFDMA, it should be understood that the concept of a transmission opportunity, i.e. TXOP, is of course not limited thereto, but rather generally applicable.

To accommodate all STAs requesting different GI lengths, the AP may group STAs by GI requirement and schedule them in different TXOPs. For example, in the first TXOP, the AP schedules four 1.6 us-GI STAs and in the subsequent TXOP, the AP will schedule five 3.2 us-GI STAs.

In US 2011/0164597, the receiver at the access point is able to detect the timing offset between MU-MIMO users in the uplink and such an offset may cause synchronization problems at the receiver. An idea is to have the access point schedule users with tolerable timing offset in the MU-MIMO transmission. According to US 2011/0164597, the receiver basically attempts to group users having less timing offset with respect to each other. In addition, the GI of one or more STAs can be adjusted such that the large delay offset between STAs can be compensated for synchronization purpose. However, the step of user grouping according to GI length requirement is not discussed at all in US 2011/0164597.

Figure 7:
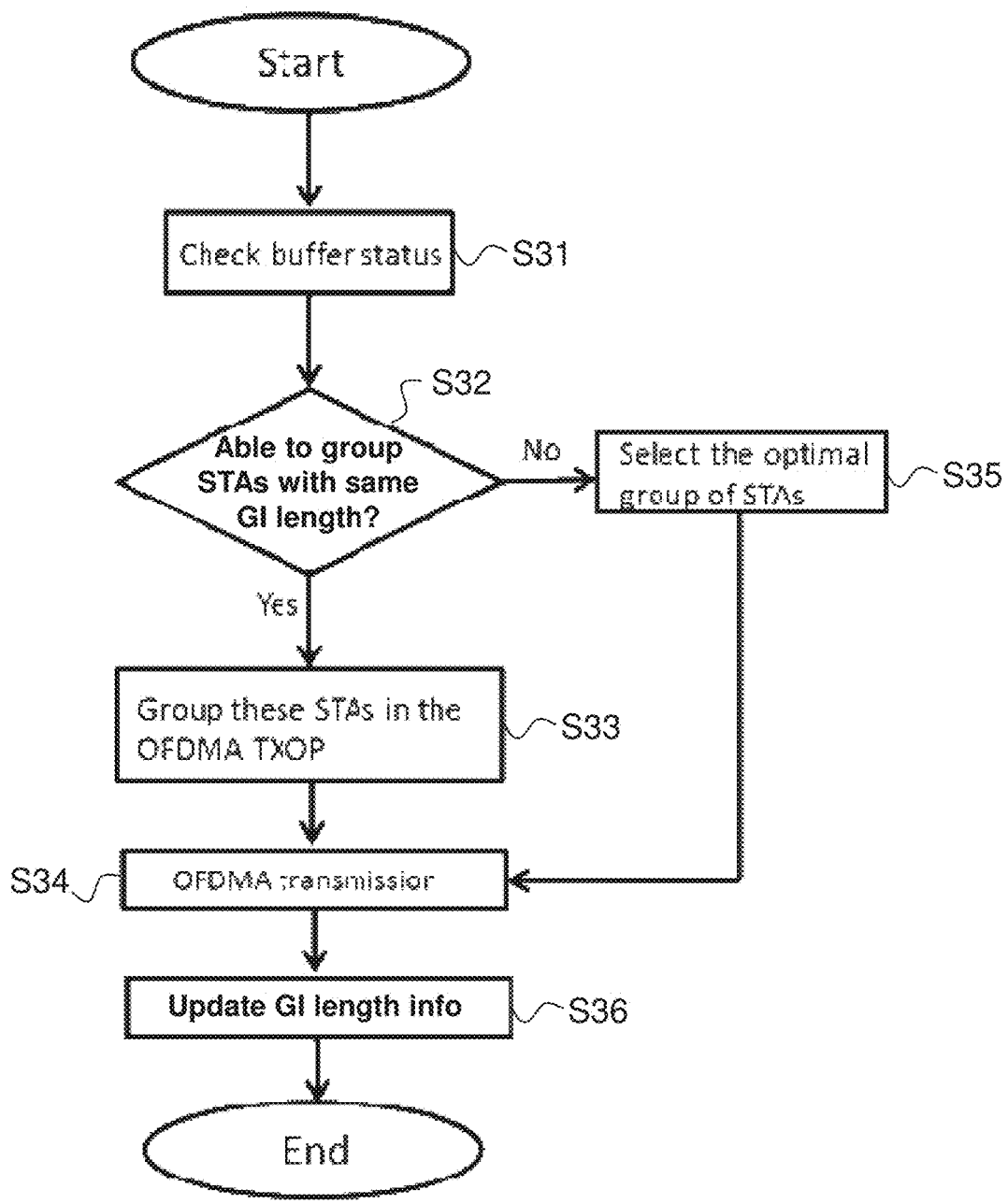
FIG. 7 is a schematic flow diagram illustrating a particular example of a procedure for user grouping according to GI length for multi-user transmission in a wireless communication system according to another embodiment.

FIG. 7 is a schematic flow diagram illustrating a particular example of a procedure for user grouping according to GI length for multi-user transmission in a wireless communication system according to another embodiment.

In this particular example, the AP first examines the buffer status, in step S31, waiting for OFDMA transmission.

If it is possible (Yes) to group a set of STAs with the same optimal GI length in the same TXOP, as checked in step S32, the AP will prioritize this type of transmissions and then perform the actual grouping, in step S33, and the subsequent multi-user transmission, e.g. OFDMA transmission, in step S34. Preferably such groups of users are scheduled for transmission in different TXOPs.

Otherwise (No), the AP will group the STAs anyway and assign an optimal GI for the TXOP such that the overall performance can be maximized, as indicated in step S35. This overall performance can be the overall throughput or the data rate/quality of service for the worst user. In other words, some STAs may not obtain their most desirable GI length. Examples of how to determine such an optimal GI will be described later on. Note that the AP may update the GI length information at a pre-determined time interval through STA report or UL measurement, as indicated in step S36.

In another embodiment, the TXOPs are characterized by GI length. For example, TXOPs may be sorted into different buffering queues, one for each GI length. For example, there may be three queues for TXOPs with GI length of 0.8 us, 1.6 us and 3.2 us. When scheduling such TXOPs, AP may follow some rules to prioritize the TXOPs in specific queues.

In the UL-OFDMA where several users transmit simultaneously towards an AP, the same GI length may be selected to allow all uplink transmissions well aligned to the same point. By way of example, a GI indication can be sent from AP by DL signaling. AP should estimate each STA's optimal GI based on individual delay spread information that is obtained by UL measurement at AP. For example, delay spread estimation can be performed on the pilot subcarriers in the long training field.

In another embodiment, in the case that AP has to group in one TXOP different STAs that have different delay spreads and thus request different GI lengths, the GI length selection should normally follow some pre-determined method. For example, the method can be that AP always satisfies the worst case among UL users, i.e., selects the longest GI that is required by some user due to relatively long delay. The decision of GI selection should be indicted to STAs that are scheduled for the next UL-OFDMA transmission. The control indication may be sent from the AP to all involved STAs through proper control signaling. The adopted GI length may be indicated to all relevant STAs/AP before they start decoding the payload part. In a specific embodiment, this indication may be represented by 2 or more bits included in the Signal, SIG, field. The format of the new SIG field namely high efficiency, HE, SIG is not decided yet. In VHT-SIG filed of 802.11ac, there is a one-bit field named "short GI" to indicate whether the short GI is adopted. Accordingly, in the HE-SIG, the field to indicate GI length should be extended to at least two bits.

Figure 8:
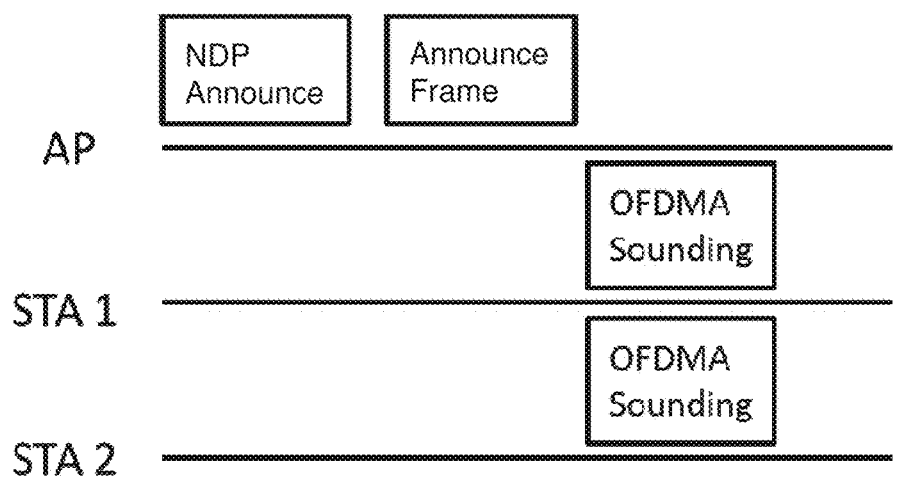
FIG. 8 is a schematic diagram illustrating an example of a sounding procedure for OFDMA.

In the DL, the AP assigns sub-bands to different users for OFDMA transmission. The AP also has the flexibility to adopt different GI lengths. The STAs may e.g. report their GI requests to the AP based on their measurements in DL. The AP may also select GI based on UL measurements and an assumption of reciprocity. The procedure of reporting GI requests can be based on sounding. For example, a Null Data Packet, NDP, sounding procedure similar to current MU-MIMO sounding is used for OFDMA sounding that includes delay spread information, equivalently GI request. An example of such a procedure is illustrated in FIG. 8. The announcement frame is accompanied by an NDP across the full bandwidth. By measuring the NDP, STAs can report channel condition such as delay spread and frequency response on each subcarrier through the OFDMA sounding frames. The OFDMA sounding from different STAs can be multiplexed in frequency as OFDMA. For example, each STA reports sounding on those the subcarriers that have already assigned to them for UL data transmission.

Selection of Non-Uniform Configuration for GI Length

Using the same GI for all STAs in a TXOP will ensure that the different STAs will be orthogonal to each other, at least under ideal conditions. However, as the different STAs may desire different GI lengths as the optimal, there could be unnecessary overhead increase for the STAs that could have used a shorter GI.

Figure 9:
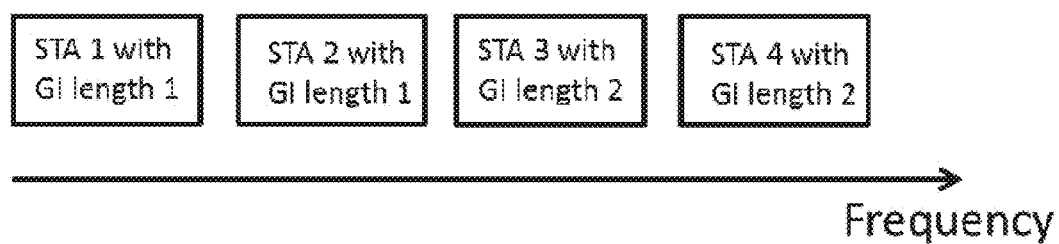
FIG. 9 is a schematic diagram illustrating an example of how to organize, in the frequency domain, users with different GI length in the same TXOP.

A specific embodiment therefore relates to the case in which different GI lengths are used in the same OFDMA symbol. This could introduce Inter-Carrier-Interference, ICI, but can be mitigated, e.g. by guard band. It is first noted that the ICI between sub-carriers is more pronounced the closer the sub-carriers are to one another. Thus, as part of this embodiment STAs with the same GI are grouped together, in the frequency domain, as much as possible. As an example, if there would be four STAs, STA1 and STA2 with a shorter GI and STA3 and STA4 with a longer GI, STA1 and STA2 would be scheduled adjacent to one another, as schematically illustrated in FIG. 9. There is no extra processing needed at the receiver side because the receiver will only process the relevant data sub-band and disregard other sub-bands that may adopt different GI length. In a further embodiment, some sub-carriers on the edges of the data sub-bands with different GI length are not used for data transmission. Instead, they are used as a guard band to separate and reduce potential ICI.

It can also be noted that the ICI can be treated as an additional noise floor. Whether this additional noise floor actually is a problem or not depends on what SINR is required, which in turn depends on what MCS is used. Suppose that a very robust modulation and coding scheme is used, then it may be so that some additional interference may not degrade the performance in any noticeable way. In this case it is beneficial to use the optimal GI for the individual STAs. In other situations, when high data rates are supported the MCS is not very robust and additional ICI may have a detrimental effect. In this case it may be preferred to use the same GI for all the STAs, although it may be sub-optimal for some of the STAs.

In the case with non-uniform GI length, the sub-band frames could be timely aligned by adjusting the length of the data field accordingly. The length difference of different GI is compensated by additional data symbols at the end. In this way, the STAs with shorter GI length can carry more data information.

The feature of non-uniform GI length enhances the flexibility of OFDMA user grouping at the expense of the ICI. In another embodiment, it is the AP that determines whether to schedule non-uniform GI users into one TXOP. For instance, if the ICI detection or packet error rate is greater than some threshold value, the AP automatically fall back to the mode of uniform GI and call for retransmission.

As previously indicated, it has been agreed to limit the options of resource unit size, i.e. sub-band size, for OFDMA Frequency Selective Scheduling, FSS, to a given set. Usually, to some extent, the resource unit size reflects the bandwidth granularity since it is always preferable to have similar frequency response across the entire sub-band. An example method for selecting sub-band size is to follow the coherence bandwidth such the sub-band size is closer to the coherence bandwidth. On the other hand, the coherence bandwidth is inversely related to the RMS delay spread, which is the major factor determining the GI length.

Hence, the inventors have recognized that some (inverse) relationship between sub-band size (related to coherence bandwidth) and GI length (related to delay spread) can be established such that GI length can be implicitly signaled and derived by a mapping between (maximum) sub-band size and GI length.

For example, a look-up table as shown in Table 1 can be used to determine the optimal GI length given the sub-band size and vice versa.

TABLE 1

An example of a look-up table implementing a mapping between (maximum) sub-band size and GI length.

| Sub-band size | GI length |
| --- | --- |
| 26-subcarrier (with 2 pilots) | 3.2 us |
| 52-subcarrier (with 2 pilots) | 1.6 us |
| 102 data-subcarrier plus 4-6 plots (to be decided) | 0.8 us |

Therefore, in a particular embodiment, an indication of sub-band size can implicitly signal the GI length by mapping the sub-band size to the corresponding GI length. For example, if the sub-band size in the current OFDMA transmission is 52-subcarrier (with 2 pilots), then the GI length is implicitly indicated as 1.6 us.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided an arrangement configured to schedule users with different Guard Interval, GI, length for multi-user transmission in a wireless communication system. Each of the users is associated with a GI length. The arrangement is configured to group at least a subset of the users into at least two groups according to GI length for transmission in allocated transmission opportunity, TXOP, resources.

By way of example, the arrangement may be configured to group users with the same GI length for transmission in the same TXOP.

In a particular example, the arrangement is configured to schedule groups of different GI length for transmission in different TXOPs.

Optionally, the arrangement is configured to operate with a number of buffering queues, wherein different TXOPs are related to different buffering queues, primarily one for each GI length.

For example, the arrangement may be configured to prioritize groups according to a predefined prioritization criterion.

According to a particular example, the arrangement may be further configured to add, for at least one group having a set of users with the same GI length, at least one additional user with a different GI length for transmission in the same TXOP.

For example, the arrangement may be configured to assign, for said at least one group, a common GI length to all users scheduled for transmission in the TXOP.

Alternatively, the arrangement may be configured to use, for said at least one group, a desired or requested GI length of each user.

Unless provided with information representing a desired or requested GI length for each of the users as input, the arrangement may be configured to determine, for each of the users, a desired or requested GI length to enable grouping of users based on GI length.

By way of example, the wireless communication system may be a WLAN system such as Wi-Fi.

According to another aspect of the proposed technology there is also provided an arrangement configured to determine an indication of Guard Interval, GI, length for at least one user in a wireless communication system. The arrangement is configured to derive the indication of GI length at least partly based on an indication of sub-band size of said at least one user.

Figure 10:
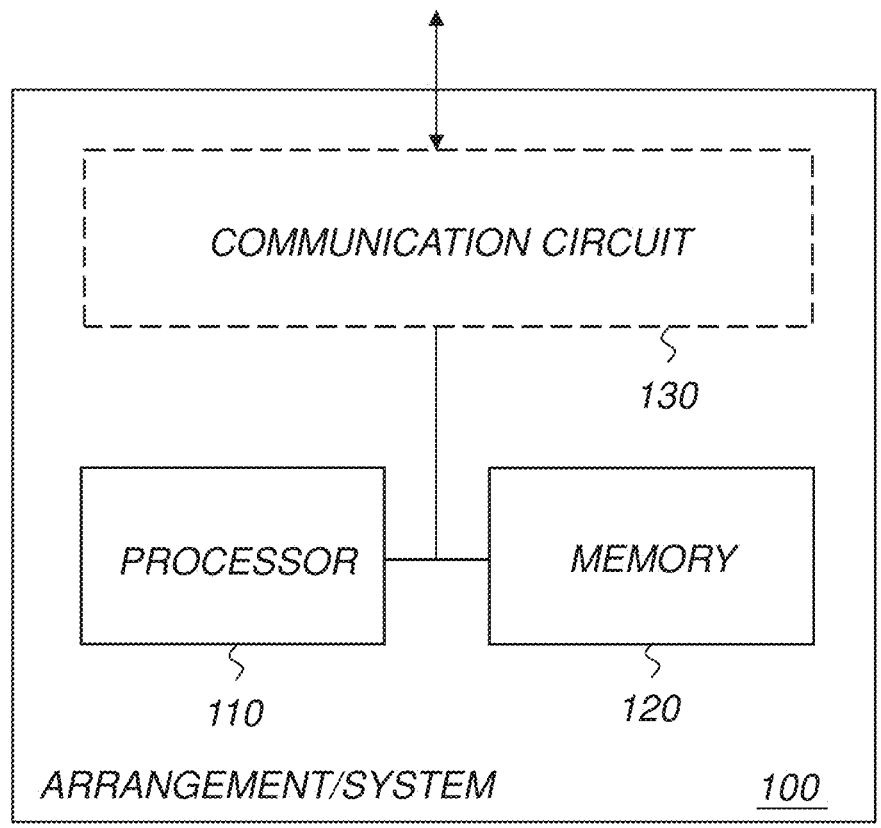
FIG. 10 is a schematic block diagram illustrating an example of an arrangement/system, based on a processor-memory implementation according to an embodiment.

FIG. 10 is a schematic block diagram illustrating an example of an arrangement/system, based on a processor-memory implementation according to an embodiment. In this particular example, the apparatus 100 comprises a processor 110 and a memory 120, said memory 120 comprising instructions executable by the processor, whereby the apparatus/processor is operative to schedule the users or derive an indication of GI length.

Optionally, the arrangement 100 may also include a communication circuit 130. The communication circuit 130 may include functions for wired and/or wireless communication with other devices and/or network nodes in the network. In a particular example, the communication circuit may be based on radio circuitry for communication with one or more other nodes, including transmitting and/or receiving information. The communication circuit 130 may be interconnected to the processor 110 and/or memory 120.

Figure 11:
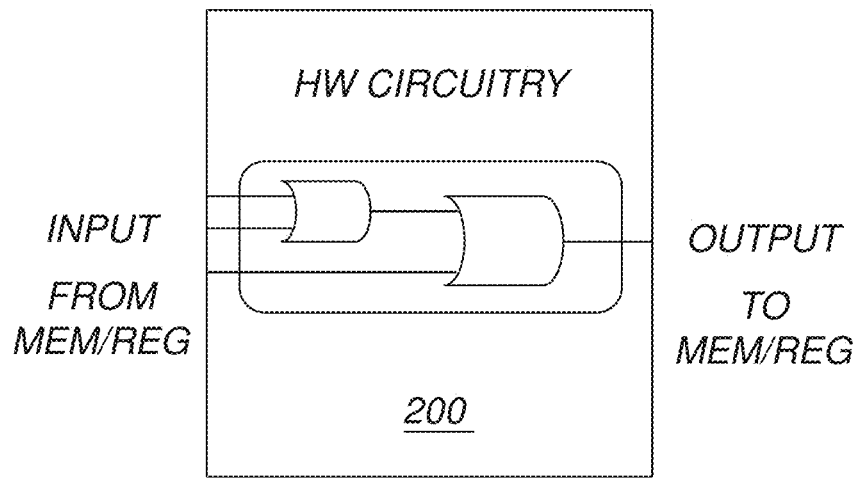
FIG. 11 is a schematic block diagram illustrating another example of an arrangement/system, based on a hardware circuitry implementation according to an embodiment.

FIG. 11 is a schematic block diagram illustrating another example of an arrangement/system, based on a hardware circuitry implementation according to an embodiment. Particular examples of suitable hardware circuitry 200 include one or more suitably configured or possibly reconfigurable electronic circuitry, e.g. Application Specific Integrated Circuits, ASICs, Field Programmable Gate Arrays, FPGAs, or any other hardware logic such as circuits based on discrete logic gates and/or flip-flops interconnected to perform specialized functions in connection with suitable registers, REG, and/or memory units, MEM.

Figure 12:
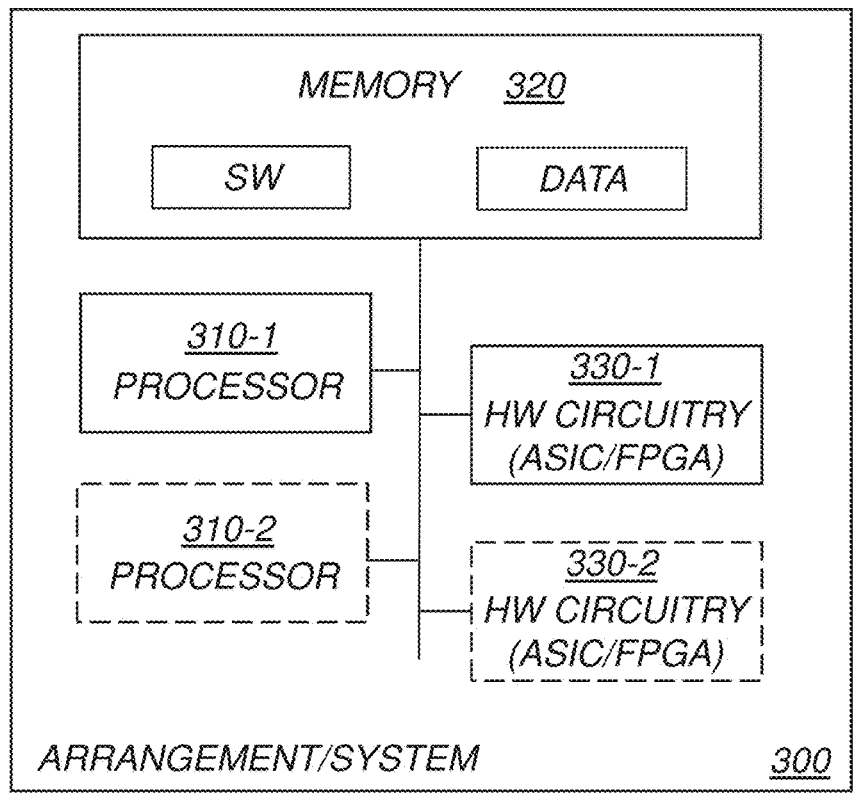
FIG. 12 is a schematic block diagram illustrating yet another example of an arrangement/system, based on combination of both processor(s) and hardware circuitry in connection with suitable memory unit(s).

FIG. 12 is a schematic block diagram illustrating yet another example of an arrangement/system, based on combination of both processor(s) and hardware circuitry in connection with suitable memory unit(s). The arrangement 300 comprises one or more processors 310-1, 310-2, memory 320 including storage for software and data, and one or more units of hardware circuitry 330-1, 330-2 such as ASICs and/or FPGAs. The overall functionality is thus partitioned between programmed software for execution on one or more processors, and one or more pre-configured or possibly reconfigurable hardware circuits such as ASICs and/or FPGAs. The actual hardware-software partitioning can be decided by a system designer based on a number of factors including processing speed, cost of implementation and other requirements.

Figure 13:
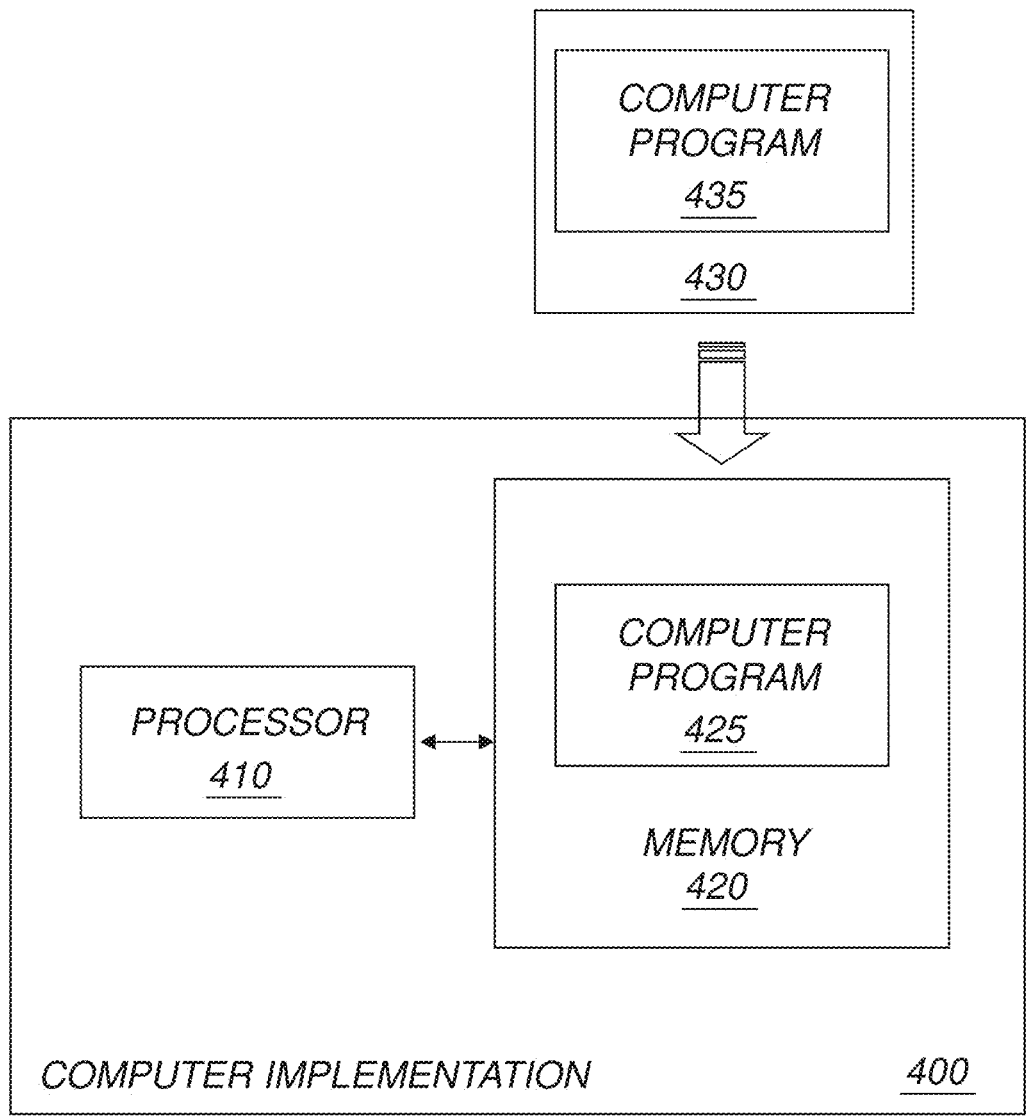
FIG. 13 is a schematic diagram illustrating an example of a computer-implementation according to an embodiment.

FIG. 13 is a schematic diagram illustrating an example of a computer-implementation according to an embodiment. In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program comprises instructions, which when executed by at least one processor, cause the processor(s) to schedule users with different Guard Interval, GI, length for multi-user transmission in a wireless communication system, by grouping at least a subset of the users into at least two groups according to GI length for transmission in allocated transmission opportunity, TXOP, resources.

In another particular embodiment, the computer program comprises instructions, which when executed by at least one processor, cause the at least one processor to determine an indication of Guard Interval, GI, length for at least one user in a wireless communication system at least partly based on an indication of sub-band size of said at least one user.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Blu-ray disc, a Universal Serial Bus, USB, memory, a Hard Disk Drive, HDD, storage device, a flash memory, a magnetic tape, or any other conventional memory device. The computer program may thus be loaded into the operating memory of a computer or equivalent processing device for execution by the processing circuitry thereof.

Figure 14:
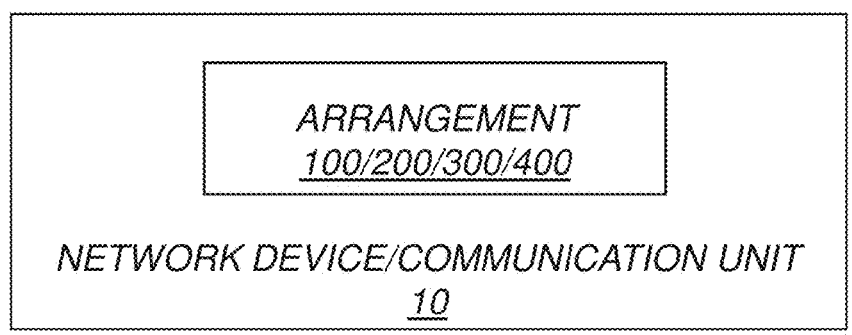
FIG. 14 is a schematic block diagram illustrating an example of a network device/communication unit comprising an arrangement according to any of the embodiments.

FIG. 14 is a schematic block diagram illustrating an example of a network device/communication unit comprising an arrangement according to any of the embodiments.

According to an aspect, there is provided a network device 10 comprising an arrangement 100; 200; 300; 400 configured to schedule users by grouping them according to GI length as described herein.

The network device may be any suitable network device in the wireless communication system, or a network device in connection with the wireless communication system. By way of example, the network device may be an access point. However, the network device may be a cloud-implemented device.

According to another aspect, there is provided a communication unit 10 in a wireless communication system, wherein the communication unit 10 comprises an arrangement 100; 200; 300; 400 configured to derive an indication of GI length as described herein. The communication unit may be any suitable communication unit in the wireless communication system. By way of example, the communication unit is a wireless communication device such as a STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 15:
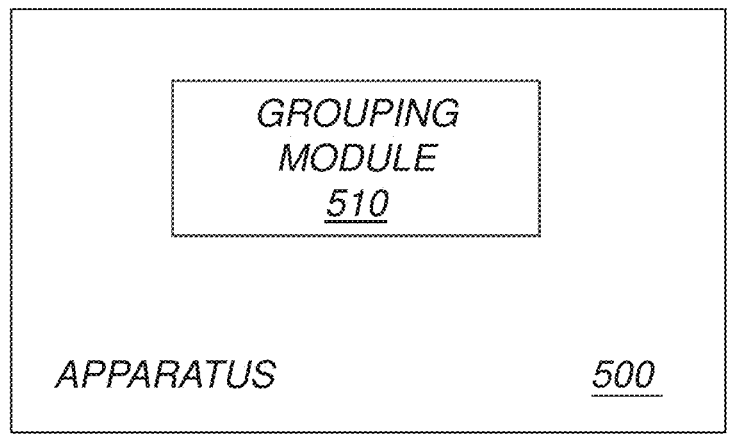
FIG. 15 is a schematic diagram illustrating an example of an apparatus for scheduling users with different Guard Interval, GI, length for multi-user transmission in a wireless communication system according to an embodiment.

FIG. 15 is a schematic diagram illustrating an example of an apparatus for scheduling users with different Guard Interval, GI, length for multi-user transmission in a wireless communication system according to an embodiment. Each of the users is associated with a GI length. The apparatus 500 comprises a grouping module 510 for grouping at least a subset of the users into at least two groups according to GI length for transmission in allocated transmission opportunity, TXOP, resources.

Figure 16:
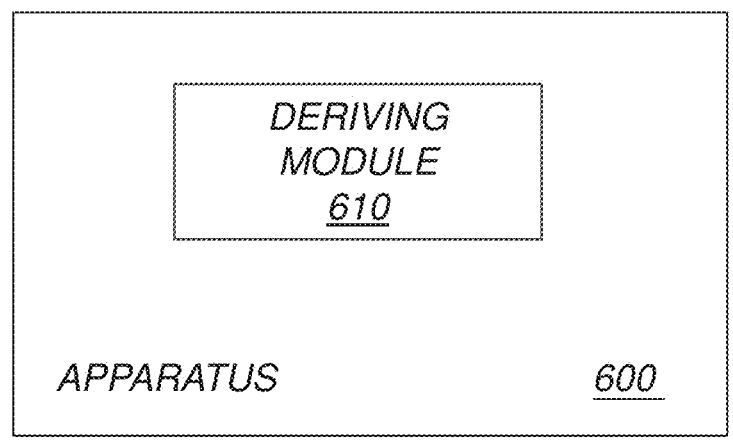
FIG. 16 is a schematic diagram illustrating an example of an apparatus for determining an indication of Guard Interval, GI, length for at least one user in a wireless communication according to an embodiment.

FIG. 16 is a schematic diagram illustrating an example of an apparatus for determining an indication of Guard Interval, GI, length for at least one user in a wireless communication according to an embodiment. The apparatus 600 comprises a deriving module 610 for deriving the indication of GI length at least partly based on an indication of sub-band size of said at least one user.

Alternatively it is possible to realize the modules in FIG. 15 and FIG. 16 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits, ASICs, as previously mentioned. Other examples of usable hardware include input/output, I/O, circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] *Payload Symbol Size for 11ax*, IEEE 802.11-15/0099, January 2015
[2] *OFDMA Numerology and Structure*, IEEE 802.11-15/0330r1, March 2015
[3] *UL MU Procedure*, IEEE 802.11-15/0365r0, March 2015
[4] US 2011/0164597
[5] WO 2015/058710

The invention claimed is:

1. A method performed by a network node in a wireless communication network, the method comprising:
   determining a required guard interval length for each wireless device among a plurality of wireless devices subject to multi-user scheduling by the wireless communication network;
   grouping the wireless devices according to their required guard interval lengths, such that at least the majority of wireless devices in each group have the same required guard interval length;
   commonly assigning a guard interval length to the members of each group that satisfies the longest required guard interval length determined for the members of the group, the assigned guard interval length taken from a predefined, discrete set of guard interval lengths; and
   scheduling, for multi-user transmissions conducted according to the commonly assigned guard length intervals, different ones of the groups in different multi-user transmission opportunities.

2. The method of claim 1, wherein the predefined, discrete set of guard interval lengths comprises two or more defined guard interval lengths of increasing or decreasing length, and wherein determining the required guard length interval for each wireless device comprises identifying the shortest one among the predefined, discrete set of guard interval lengths that satisfies the required guard interval length, as determined for the wireless device in dependence on current data requirements or channel conditions.

3. The method of claim 1, wherein grouping the wireless devices according to their required guard interval lengths comprises strictly grouping the wireless devices, such that all members of each group have the same required guard interval length.

4. The method of claim 1, wherein grouping the wireless devices according to their required guard interval length comprises forming respective groups such that substantially all of the members of each group have the same required guard interval length and then reassigning one or more members from a later scheduled one of the groups to an earlier scheduled one of the groups, and commonly assigning to each group one of the guard interval lengths from the predefined, discrete set of guard interval lengths that satisfies the longest required guard interval length associated with the members of the group.

5. The method of claim 4, wherein reassigning one or more members from a later scheduled one of the groups to an earlier scheduled one of the groups comprises determining scheduling requirements or priorities for one or more of the wireless communication devices and reassigning at least one of the one or more wireless communication devices from its current group to an earlier scheduled group, in dependence on the scheduling requirements or priorities.

6. The method of claim 1, wherein, with respect to an overall multi-user scheduling cycle, scheduling different ones of the groups in different multiuser transmission opportunities comprises scheduling the groups such that there is one or more earlier scheduled groups and one or more later scheduled groups, and determining finalized group memberships based on required guard length intervals and scheduling priorities associated with respective ones of the wireless communication devices in the plurality of wireless communication devices.

7. A network node configured for operation in a wireless communication network, the network node comprising:
   communication circuitry configured for wireless communication; and
   processing circuitry operatively associated with the communication circuitry and configured to:
   determine a required guard interval length for each wireless device among a plurality of wireless devices subject to multi-user scheduling by the wireless communication network;
   group the wireless devices according to their required guard interval lengths, such that at least the majority of wireless devices in each group have the same required guard interval length;
   commonly assign a guard interval length to the members of each group that satisfies the longest required guard interval length determined for the members of the group, the assigned guard interval length taken from a predefined, discrete set of guard interval lengths; and
   schedule, for multi-user transmissions conducted according to the commonly assigned guard length intervals, different ones of the groups in different multi-user transmission opportunities.

8. The network node of claim 7, wherein the predefined, discrete set of guard interval lengths comprises two or more defined guard interval lengths of increasing or decreasing length, and wherein the processing circuitry is configured to determine the required guard length interval for each wireless device by identifying the shortest one among the predefined, discrete set of guard interval lengths that satisfies the required guard interval length, as determined for the wireless device in dependence on current data requirements or channel conditions.

9. The network node of claim 7, wherein the processing circuitry is configured to group the wireless devices according to their required guard interval lengths by strictly grouping the wireless devices, such that all members of each group have the same required guard interval length.

10. The network node of claim 7, wherein the processing circuitry is configured to group the wireless devices according to their required guard interval length by forming respective groups such that substantially all of the members of each group have the same required guard interval length and then reassigning one or more members from a later scheduled one of the groups to an earlier scheduled one of the groups, and commonly assigning to each group one of the guard interval lengths from the predefined, discrete set of guard interval lengths that satisfies the longest required guard interval length associated with the members of the group.

11. The network node of claim 10, wherein the processing circuitry is configured to reassign one or more members from a later scheduled one of the groups to an earlier scheduled one of the groups, based on determining scheduling requirements or priorities for one or more of the wireless communication devices and reassigning at least one of the one or more wireless communication devices from its current group to an earlier scheduled group, in dependence on the scheduling requirements or priorities.

12. The network node of claim 7, wherein, with respect to an overall multi-user scheduling cycle, the processing circuitry is configured to schedule different ones of the groups in different multiuser transmission opportunities by scheduling the groups such that there is one or more earlier scheduled groups and one or more later scheduled groups, and determining finalized group memberships based on required guard length intervals and scheduling priorities associated with respective ones of the wireless communication devices in the plurality of wireless communication devices.

* * * * *